US011173906B2

(12) United States Patent
Mizutani et al.

(10) Patent No.: US 11,173,906 B2
(45) Date of Patent: Nov. 16, 2021

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Akira Mizutani, Wako (JP); Atsushi Ishioka, Wako (JP); Akihiko Otsu, Wako (JP); Daichi Kato, Wako (JP); Kazuyuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 16/481,588

(22) PCT Filed: Feb. 3, 2017

(86) PCT No.: PCT/JP2017/003926
§ 371 (c)(1),
(2) Date: Jul. 29, 2019

(87) PCT Pub. No.: WO2018/142568
PCT Pub. Date: Aug. 9, 2018

(65) Prior Publication Data
US 2019/0389463 A1    Dec. 26, 2019

(51) Int. Cl.
*B60W 30/165* (2020.01)
*G05D 1/00* (2006.01)
*G05D 1/02* (2020.01)

(52) U.S. Cl.
CPC ......... *B60W 30/165* (2013.01); *G05D 1/0088* (2013.01); *G05D 1/0291* (2013.01);
(Continued)

(58) Field of Classification Search
CPC .......... B60W 30/165; B60W 2554/00; B60W 2400/00; B60W 2552/50; G05D 1/0088; G05D 1/0291; G05D 2201/0213
(Continued)

(56) References Cited

U.S. PATENT DOCUMENTS

2004/0176900 A1    9/2004 Yajima
2013/0110343 A1    5/2013 Ichikawa et al.
(Continued)

FOREIGN PATENT DOCUMENTS

JP    2003-151091    5/2003
JP    2003-151098    5/2003
(Continued)

OTHER PUBLICATIONS

English Translation: Yamamoto, Japanese Patent Publication JP-2003151098-A, May 2003, Japanese Patent Office (Year: 2003).*
(Continued)

*Primary Examiner* — Nadeem Odeh
(74) *Attorney, Agent, or Firm* — Amin, Turocy & Watson, LLP

(57) ABSTRACT

A vehicle control system includes a vehicle selector configured to select, from among other vehicles present near an own vehicle, another vehicle that the own vehicle is to follow when traveling in front of a gate as a following target vehicle, and a gate passage controller configured to cause the own vehicle to travel following the following target vehicle selected by the vehicle selector when passing through the gate.

14 Claims, 15 Drawing Sheets

(52) U.S. Cl.
CPC ..... *B60W 2400/00* (2013.01); *B60W 2554/00* (2020.02); *G05D 2201/0213* (2013.01)

(58) Field of Classification Search
USPC .......................................................... 701/25
See application file for complete search history.

(56) References Cited

U.S. PATENT DOCUMENTS

| 2017/0232967 | A1* | 8/2017 | Tomatsu | ........... | B60W 30/0956 |
| | | | | | 701/117 |
| 2018/0065630 | A1* | 3/2018 | Tamura | ................ | B60W 10/20 |
| 2018/0148070 | A1* | 5/2018 | Abe | ...................... | G07B 15/00 |

FOREIGN PATENT DOCUMENTS

| JP | 2004-034917 | 2/2004 |
| JP | 2004-265238 | 9/2004 |
| JP | 2018-106381 | 7/2018 |
| WO | 2011-158347 | 12/2011 |

OTHER PUBLICATIONS

English Translation: Yamamoto, Japanese Patent Publication JP-2003151091-A, May 2003, Japanese Patent Office (Year: 2003).*
International Search Report and Written Opinion for International Application Serial No. PCT/JP2017/003926 dated May 9, 2017, 11 pages.
Japanese Office Action for Japanese Patent Application No. 2018-565193 dated Dec. 17, 2019.

\* cited by examiner

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

BACKGROUND ART

Research on automated driving has advanced in recent years. In this regard, a driving support device that, when an instruction to start automated driving of an own vehicle has been issued by the driver's operation, generates a route for automated driving and starts automated driving if a destination has been set and performs automated driving for traveling along the current traveling path of the own vehicle if no destination has been set is known (see, for example, Patent Literature 1).

CITATION LIST

Patent Literature

[Patent Literature 1]
PCT International Publication No. WO2011/158347

SUMMARY OF INVENTION

Technical Problem

However, control of automated driving when passing through gates such as those of toll plazas has not been taken into consideration in the related art. Therefore, sometimes behavior of vehicles during automated driving may not be smoothly performed in front of gates.

The present invention has been made in view of such circumstances and it is an object of the present invention to provide a vehicle control system, a vehicle control method, and a storage medium that can smoothly control a vehicle.

Solution to Problem (1): A vehicle control system including a vehicle selector configured to select, from among other vehicles present near an own vehicle, another vehicle that the own vehicle is to follow when traveling in front of a gate as a following target vehicle, and a gate passage controller configured to cause the own vehicle to travel following the following target vehicle selected by the vehicle selector when passing through the gate.

(2): The vehicle control system according to (1), further comprising a gate selector configured to select a gate through which the own vehicle is to pass, wherein the vehicle selector is configured to select another vehicle, which is determined to pass through the gate selected by the gate selector, as the following target vehicle.

(3): The vehicle control system according to (2), further comprising an information acquirer configured to acquire information that enables determination of a gate through which another vehicle is scheduled to pass, wherein the vehicle selector is configured to determine a gate through which the other vehicle is to pass on the basis of information acquired by the information acquirer.

(4): The vehicle control system according to (1), wherein the vehicle selector is configured to select, as the following target vehicle, another vehicle located at a tail end of a vehicle line.

(5): The vehicle control system according to (1), further comprising an information acquirer configured to acquire a route along which another vehicle is scheduled to travel, wherein the vehicle selector is configured to select, as the following target vehicle, another vehicle scheduled to travel along a route that matches a route along which the own vehicle is scheduled to travel on the basis of information acquired by the information acquirer.

(6): The vehicle control system according to (1), wherein the vehicle selector is configured to, when there are a plurality of candidate vehicles that are likely to be a following target vehicle, select a candidate vehicle present at a position closest to the own vehicle among the plurality of candidate vehicles as a following target vehicle.

(7): The vehicle control system according to (1), wherein the gate passage controller is configured to start following the following target vehicle within an area in which road lane lines are drawn.

(8): The vehicle control system according to (7), wherein the gate passage controller is configured to cause the own vehicle to change lanes to an adjacent lane when the vehicle selector has determined that the following target vehicle is not present in front of the own vehicle and is present in the adjacent lane.

(9): The vehicle control system according to (1), wherein the gate passage controller is configured to cancel control for following a following target vehicle upon determining that it is inappropriate to follow the following target vehicle on the basis of a state of the following target vehicle.

(10): The vehicle control system according to (9), wherein the vehicle selector is configured to, when the gate passage controller has determined that it is inappropriate to follow the following target vehicle, select another vehicle different from the selected following target vehicle as a following target vehicle.

(11): The vehicle control system according to (1), wherein the vehicle selector is configured to acquire information on a type of a gate through which other vehicles are able to pass and to select the following target vehicle on the basis of the acquired information on the type of the gate.

(12): A vehicle control method including an in-vehicle computer performing control for selecting, from among other vehicles present near an own vehicle, another vehicle that the own vehicle is to follow when traveling in front of a gate as a following target vehicle, and causing the own vehicle to travel following the selected following target vehicle when passing through the gate.

(13): A computer-readable non-transitory storage medium storing a vehicle control program causing an in-vehicle computer to perform control for selecting, from among other vehicles present near an own vehicle, another vehicle that the own vehicle is to follow when traveling in front of a gate as a following target vehicle, and causing the own vehicle to travel following the selected following target vehicle when passing through the gate.

Advantageous Effects of Invention

According to (1)-(5), (12), and (13), the gate passage controller causes the own vehicle to travel following the following target vehicle selected by the vehicle selector and thus it is possible to smoothly control the vehicle.

According to (6), when there are a plurality of vehicles that are likely to be a following target, the vehicle selector selects a candidate vehicle present at a location closest to the own vehicle among the plurality of candidate vehicles as a following target vehicle and thus it is possible to more smoothly follow the following target vehicle.

According to (7), the gate passage controller starts following the following target vehicle in the area in which road lane lines are drawn, such that control is performed in a traffic condition in which vehicles follow lanes, and therefore it is possible to more easily follow the following target vehicle.

According to (9) and (10), the gate passage controller cancels the following upon determining that it is inappropriate to follow the following target vehicle on the basis of the state of the following object vehicle and thus it is possible to prevent the own vehicle from following another vehicle that is inappropriate to follow.

According to (11), the vehicle selector selects a following target vehicle on the basis of information on the types of gates through which other vehicles are able to pass, and thus it is possible to select another vehicle, which is to pass through a gate corresponding to the type of a gate through which the own vehicle desires to pass, as a following target vehicle. As a result, the convenience for the occupant of the vehicle is improved.

DESCRIPTION OF EMBODIMENTS

Hereinafter, embodiments of a vehicle control system, a vehicle control method, and a storage medium of the present invention will be described with reference to the drawings.

First Embodiment

[Overall Configuration]

Figure 1:
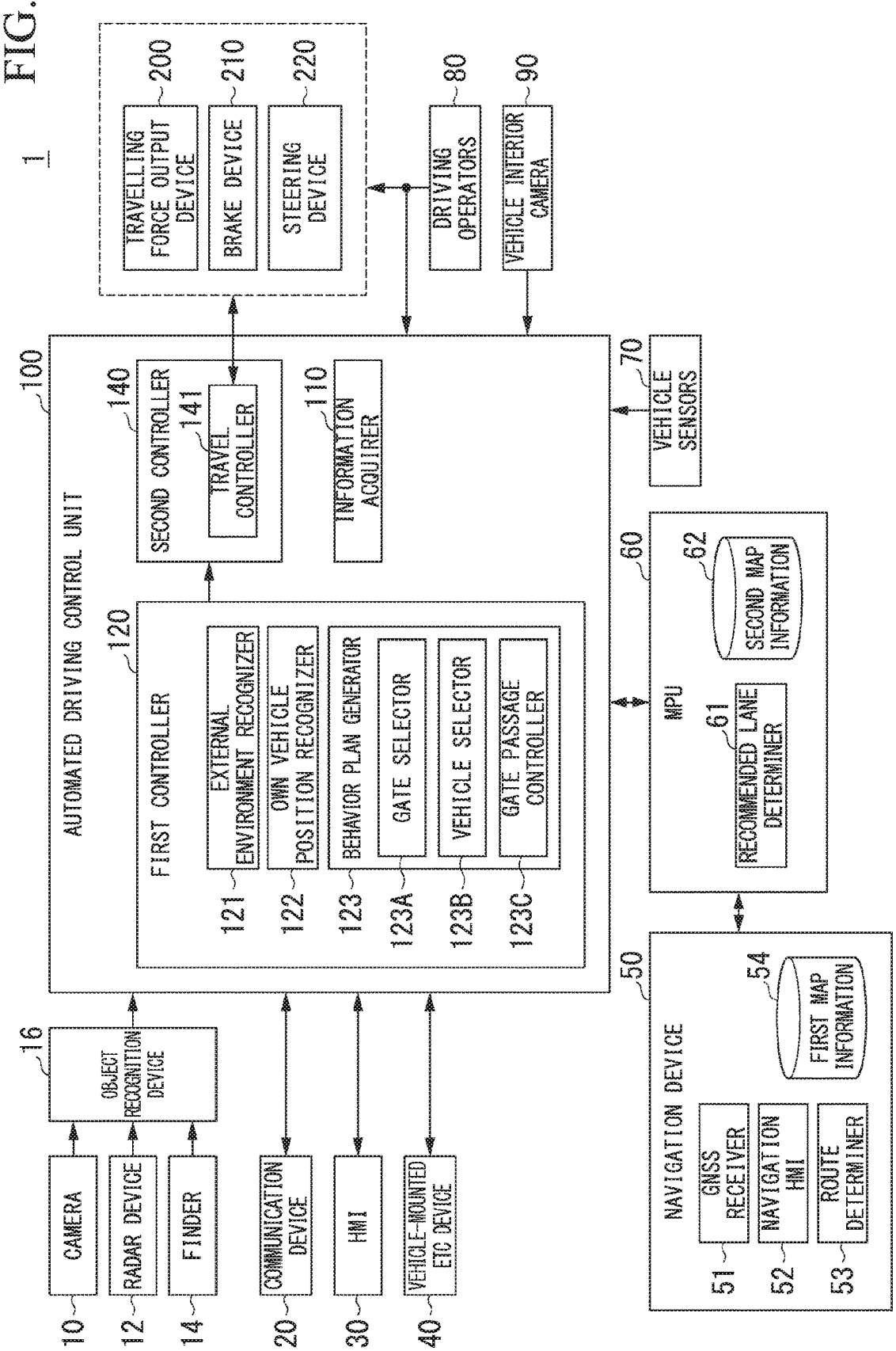
FIG. 1 is a configuration diagram of a vehicle system including an automated driving control unit.

FIG. 1 is a configuration diagram of a vehicle system 1 including an automated driving control unit 100. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a vehicle-mounted electronic toll collection system (ETC) device 40, a navigation device 50, a microprocessing unit (MPU) 60, vehicle sensors 70, driving operators 80, a vehicle interior camera 90, an automated driving control unit 100, a travelling force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or a complementary metal oxide semiconductor (CMOS). One or a plurality of cameras 10 are attached to the vehicle in which the vehicle system 1 is mounted (hereinafter referred to as an own vehicle M) at arbitrary locations. For imaging the area in front of the vehicle, a camera 10 is attached to an upper portion of a front windshield, a rear surface of a rearview mirror, or the like. For example, the camera 10 repeats imaging of the surroundings of the own vehicle M at regular intervals. The camera 10 may also be a stereo camera.

The radar device 12 radiates radio waves such as millimeter waves around the own vehicle M and detects radio waves reflected by an object (reflected waves) to detect at least the position (distance and orientation) of the object. One or a plurality of radar devices 12 may be attached to the own vehicle M at arbitrary locations. The radar device 12 may detect the position and speed of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the own vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own vehicle M and receives an input operation from the occupant. The HMI 30 includes various display devices, speakers, buzzers, touch panels, switches, or keys.

The vehicle-mounted ETC device 40 includes a mounting unit to which an ETC card is mounted and a wireless communicator that communicates with an ETC roadside device provided at a gate of a toll road. The wireless communicator may be shared with the communication device 20. The vehicle-mounted ETC device 40 communicates with the ETC roadside device to exchange information such as that of an entrance toll booth or an exit toll booth. The ETC roadside device determines the charge amount for the occupant of the own vehicle M on the basis of these pieces of information and proceeds with a billing process.

The navigation device 50 includes, for example, a global navigation satellite system (GNSS) receiver 51, a navigation HMI 52, and a route determiner 53 and holds first map information 54 in a storage device such as a hard disk drive (HDD) or a flash memory. The GNSS receiver specifies the position of the own vehicle M on the basis of signals received from GNSS satellites. The position of the own vehicle M may also be specified or supplemented by an inertial navigation system (INS) using the output of the vehicle sensors 70. The navigation HMI 52 includes a display device, a speaker, a touch panel, a switch, a key, or the like. The navigation HMI 52 may be partly or wholly shared with the HMI 30 described above. For example, the route determiner 53 determines a route from the position of the own vehicle M specified by the GNSS receiver 51 (or an arbitrary input position) to a destination input by the occupant using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The route determined by the route determiner 53 is output to the MPU 60. The navigation device 50 may also perform route guidance using the navigation HMI 52 on the basis of the route determined by the route determiner 53. The navigation device 50 may be realized, for example, by a function of a terminal device such as a smartphone or a tablet terminal possessed by the user. The navigation device 50 may also transmit the current position and the destination to a navigation server via the communication device 20 and acquire a route returned from the navigation server.

The MPU 60 functions, for example, as a recommended lane determiner 61 and holds the second map information 62 in a storage device such as an HDD or a flash memory. The recommended lane determiner 61 divides the route provided from the navigation device 50 into a plurality of blocks (for example, into blocks each 100 meters long in the direction in which the vehicle travels) and determines a target lane for each block by referring to the second map information 62. The recommended lane determiner 61 determines the number of the lane from the left in which to travel. When there is a branch point, a merge point, or the like on the route, the recommended lane determiner 61 determines a recommended lane such that the own vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The second map information 62 also stores information on gates near entrance toll plazas or exit toll plazas. The information on the gates is information indicating the number of gates at each toll plaza, the positions of the gates, and the like.

The vehicle sensors 70 include, for example, a vehicle speed sensor that detects the speed of the own vehicle M, an acceleration sensor that detects the acceleration thereof, a yaw rate sensor that detects an angular speed thereof about the vertical axis, an orientation sensor that detects the orientation of the own vehicle M, or the like.

The driving operators 80 include, for example, an accelerator pedal, a brake pedal, a shift lever, a steering wheel, and other operators. Sensors for detecting the amounts of operation or the presence or absence of operation are attached to the driving operators 80 and detection results thereof are output to either or both of the automated driving control unit 100 or the travelling force output, brake, and steering devices 200, 210, and 220.

The vehicle interior camera 90 captures an image of, for example, the upper body around the face of an occupant seated in the driver's seat. The captured image of the vehicle interior camera 90 is output to the automated driving control unit 100.

The automated driving control unit 100 includes, for example, an information acquirer 110, a first controller 120, and a second controller 140. Each of the information acquirer 110, the first controller 120, and the second controller 140 is realized by a processor such as a central processing unit (CPU) executing a program (software). Some or all of these functional units may be realized by hardware such as a large scale integration (LSI), an application specific integrated circuit (ASIC), or a field-programmable gate array (FPGA) or may be realized by hardware and software in cooperation.

The information acquirer 110 causes the communication device 20 to communicate with other vehicles to acquire information from the other vehicles.

The first controller 120 includes, for example, the external environment recognizer 121, the own vehicle position recognizer 122, and the behavior plan generator 123.

The external environment recognizer 121 recognizes states such as the position, speed and acceleration of a nearby vehicle on the basis of information that is input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognizer 121 may also recognize the positions of guardrails or utility poles, parked vehicles, pedestrians, and other objects in addition to nearby vehicles.

The own vehicle position recognizer 122 recognizes, for example, a (traveling) lane in which the own vehicle M is traveling and the relative position and attitude of the own vehicle M with respect to the traveling lane. The own vehicle position recognizer 122 recognizes the traveling lane, for example, by comparing a pattern of road lane lines (for example, an arrangement of solid and broken lines) obtained from the second map information 62 with a pattern of road lane lines near the own vehicle M recognized from an image captured by the camera 10. This recognition may be performed taking into consideration a position of the own vehicle M acquired from the navigation device 50 or a result of processing by the INS.

Figure 2:
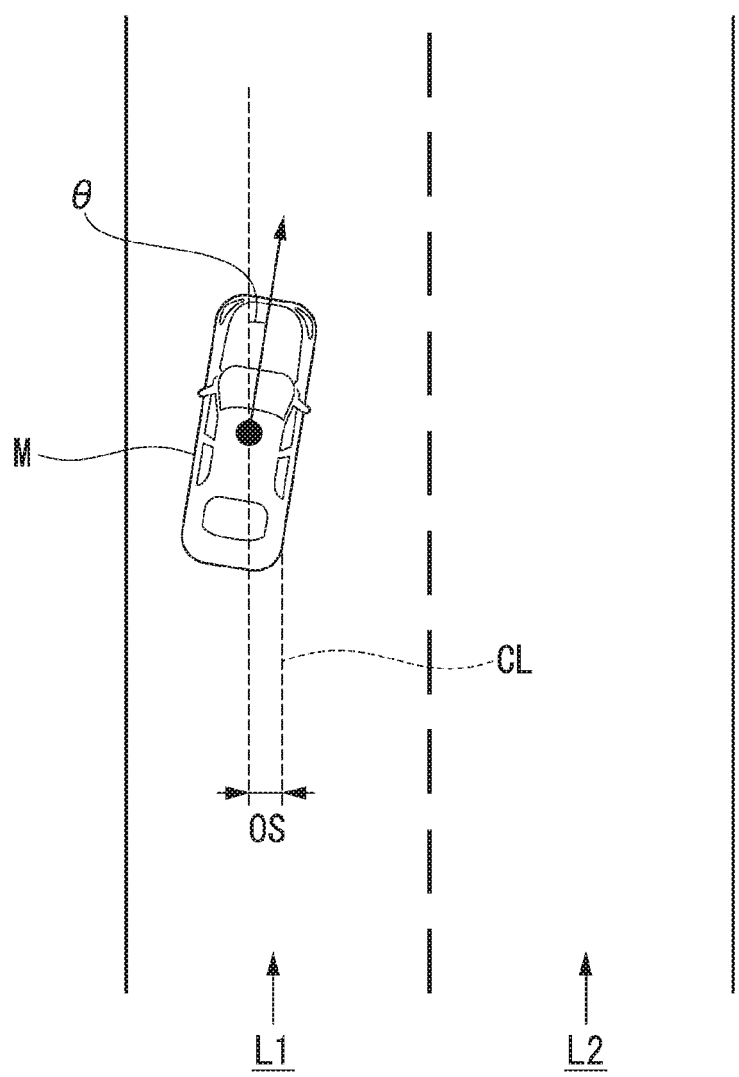
FIG. 2 is a diagram showing how the relative position and attitude of an own vehicle M with respect to a traveling lane L1 are recognized by an own vehicle position recognizer 122.

The own vehicle position recognizer 122 recognizes, for example, the position or attitude of the own vehicle M with respect to the traveling lane. FIG. 2 is a diagram showing how the relative position and attitude of the own vehicle M with respect to the traveling lane L1 are recognized by the own vehicle position recognizer 122. For example, the own vehicle position recognizer 122 recognizes both a deviation OS from a traveling lane center CL of a reference point (for example, the center of gravity) of the own vehicle M and an angle θ formed by the travel direction of the own vehicle M relative to an extension line of the traveling lane center CL as the relative position and attitude of the own vehicle M with respect to the traveling lane L1. Alternatively, the own vehicle position recognizer 122 may recognize the position of the reference point of the own vehicle M with respect to one of the sides of the own lane L1 or the like as the relative position of the own vehicle M with respect to the traveling lane. The relative position of the own vehicle M recognized by the own vehicle position recognizer 122 is provided to the recommended lane determiner 61 and the behavior plan generator 123.

The behavior plan generator 123 determines events which are to be sequentially performed in the automated driving such that the own vehicle M travels in the recommended lane determined by the recommended lane determiner 61 and copes with situations occurring near the own vehicle M. Examples of the events include a constant-speed travel event which is an event of traveling in the same lane at a constant speed, a following travel event which is an event of following a preceding vehicle, a lane change event, a merging event, a branching event, an emergency stop event, and a handover event which is an event of terminating automated driving and switching to manual driving. While these events are being executed, behaviors for avoidance may sometimes be planned on the basis of situations occurring near the own vehicle M (such as the presence of nearby vehicles and pedestrians or lane narrowing due to road construction).

The behavior plan generator 123 generates a target trajectory along which the own vehicle M will travel in the future. The target trajectory includes, for example, a speed element. For example, the target trajectory is generated as a set of target positions (trajectory points) to be reached at a plurality of future reference times which are set at intervals of a predetermined sampling time (for example, about tenths of a second). Therefore, when the interval between trajectory points is great, this means that the vehicle travels at a high speed in the section between the trajectory points.

Figure 3:
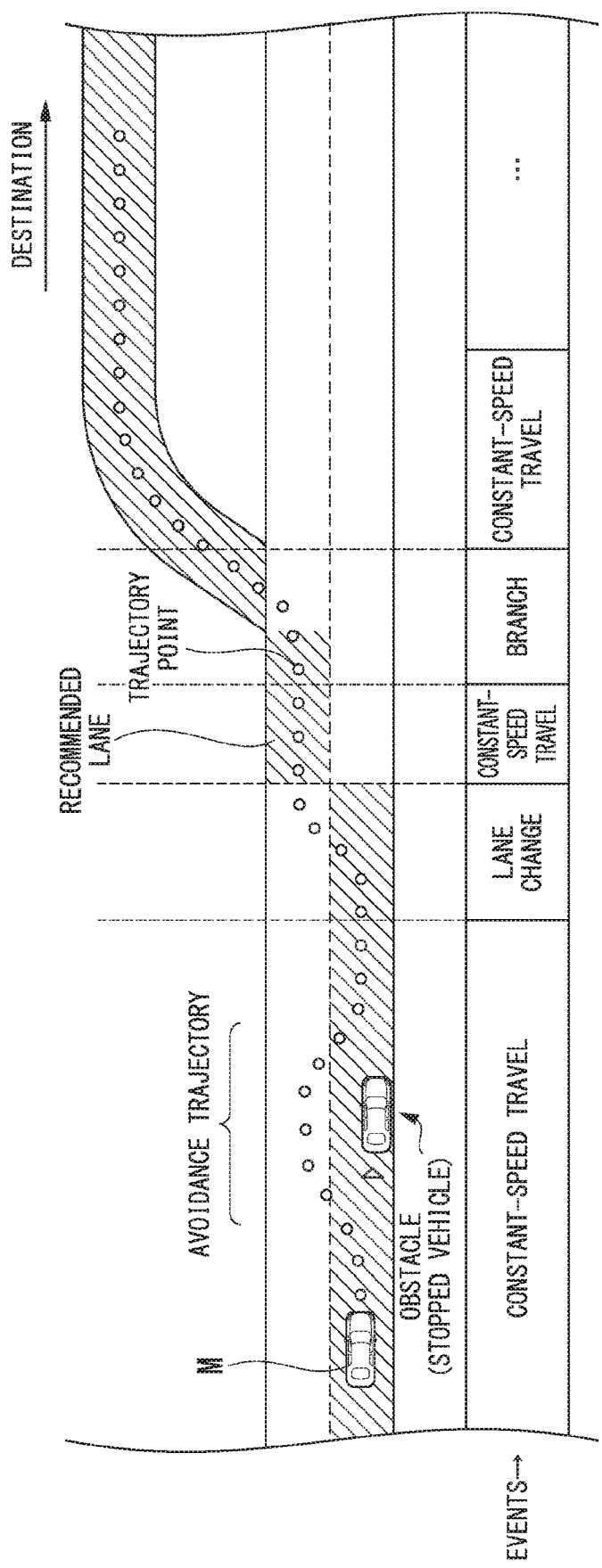
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own vehicle M approaches a predetermined distance (which may be determined according to the types of events) before a position for switching to the recommended lane, the behavior plan generator 123 activates a lane change event, a branching event, a merging event, or the like. When it becomes necessary to avoid an obstacle during execution of each event, an avoidance trajectory is generated as shown in FIG. 3.

For example, the behavior plan generator 123 generates a plurality of candidate target trajectories and selects an optimal target trajectory at a given point in time from the viewpoint of safety and efficiency.

The behavior plan generator 123 includes, for example, a gate selector 123A, a vehicle selector 123B, and a gate passage controller 123C. Details of processing of these functional units will be described later. A combination of the gate selector 123A, the vehicle selector 123B, and the gate passage controller 123C is an example of the "vehicle control system."

The second controller 140 includes a travel controller 141. The travel controller 141 controls the travelling force output device 200, the brake device 210, and the steering device 220 such that the own vehicle M passes along the target trajectory generated by the behavior plan generator 123 at scheduled times.

The travelling force output device 200 outputs a travelling force (torque) required for the vehicle to travel to driving wheels. The travelling force output device 200 includes, for example, a combination of an internal combustion engine, an electric motor, a transmission, and the like and an ECU that controls them. The ECU controls the above constituent elements according to information input from the travel controller 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel controller 141 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel controller 141 and transmits the hydraulic pressure of the master cylinder to the cylinder.

The steering device 220 includes, for example, a steering ECU and an electric motor. The electric motor, for example, applies a force to a rack-and-pinion mechanism to change the direction of the steering wheel. The steering ECU drives the electric motor according to information input from the travel controller 141 or information input from the driving operators 80 to change the direction of the steering wheel.

[Details of Gate Selector and Gate Passage Controller]

The gate selector 123A selects a gate through which the own vehicle M is to pass. The vehicle selector 123B selects, from among other vehicles present near the own vehicle M, another vehicle which the own vehicle M is to follow when traveling in front of the gate as a following target vehicle. The gate passage controller 123C causes the own vehicle M to travel following the following target vehicle selected by the vehicle selector 123B when passing through the gate.

Figure 4:
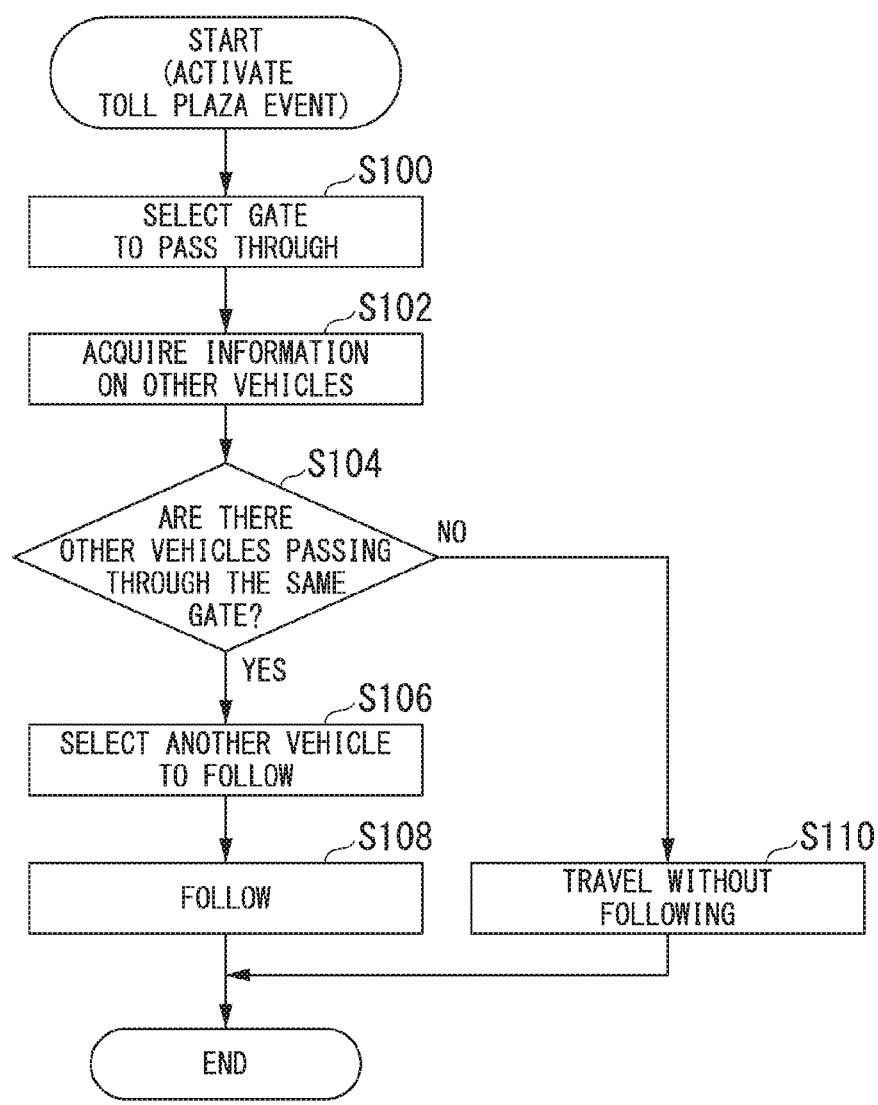
FIG. 4 is a flowchart showing a flow of a process executed by a behavior plan generator.

FIG. 4 is a flowchart showing a flow of a process executed by the behavior plan generator 123. The process of this flowchart is executed when a toll plaza event is activated. For example, the behavior plan generator 123 activates a toll plaza event at a predetermined distance before the toll plaza (for example, a predetermined distance before an end point of a main line). When an activation position indicating a position where to activate a toll plaza event has been associated with the second map information 62, the behavior plan generator 123 activates a toll plaza event when the own vehicle M has reached a position corresponding to the activation position.

First, the gate selector 123A selects a gate to pass through from among gates provided at the toll plaza (step S100). For example, a gate close to a lane scheduled to be traveled in after passing through the toll plaza or a gate from which it is determined that it is relatively easy to enter the lane scheduled to be traveled in is selected as the gate to pass through. The gate selector 123A selects the gate to pass through, for example, on the basis of the high accuracy map information 62.

Next, the information acquirer 110 acquires information on other vehicles present near the own vehicle M (information that enables determination of the gate to pass through) (step S102). The information on other vehicles is, for example, information such as information on the positions of the other vehicles, information on gates through which the other vehicles are scheduled to pass, lanes in which the other vehicles are scheduled to travel after passing through gates, and the destinations of the other vehicles.

Next, the vehicle selector 123B determines whether or not there are other vehicles scheduled to pass through the same gate as that selected in step S100 on the basis of the information on other vehicles acquired in step S102 (step S104).

When there are other vehicles scheduled to pass through the same gate, the vehicle selector 123B selects, from among the other vehicles scheduled to pass through the same gate as that of the own vehicle M, another vehicle which the own vehicle M is to follow as a following target vehicle on the basis of the information on other vehicles acquired in step S102 (step S106). For example, the vehicle selector 123B selects another vehicle, which is scheduled to pass through the same gate as that selected in step S100 and is easy to follow from the position of the own vehicle M, as a following target vehicle. The vehicle selector 123B may also select another vehicle, which is scheduled to pass through the same gate as that selected in step S100 and is also scheduled to travel in the same lane or route as that of the own vehicle M after passing through the gate, as a following target vehicle. Further, for example, when there are a plurality of candidate vehicles that are likely to be a following target vehicle, priority is given to each candidate vehicle on the basis of a predetermined reference (for example, the distance to the own vehicle M or the position relative to the own vehicle M) and a candidate vehicle with a high priority is selected as a following target vehicle. For example, among other vehicles traveling in front of the own vehicle M within a predetermined distance from the own vehicle M, a candidate vehicle present at a position closest to the own vehicle M is selected as a following target vehicle.

"Closest" is determined, for example, on the basis of the shortest distance between the own vehicle M and another vehicle. For the own vehicle M and other vehicles traveling just in front of the own vehicle M, the distances between a front end of the own vehicle M and rear ends of the other vehicles are those to be compared.

Then, the gate passage controller 123C performs control for following the following target vehicle selected in step S108 to pass through the selected gate (step S108). When another vehicle traveling in a lateral direction with respect to the own vehicle M is selected as a following target vehicle, the gate passage controller 123C causes the own vehicle M to temporarily move back or temporarily stop at the location such that it is located behind the following target vehicle and then causes the own vehicle M to follow the following target vehicle. Then, the process of this flowchart ends. Through the process described above, the gate passage controller 123C can smoothly control the vehicle when passing through a gate.

Figure 5:
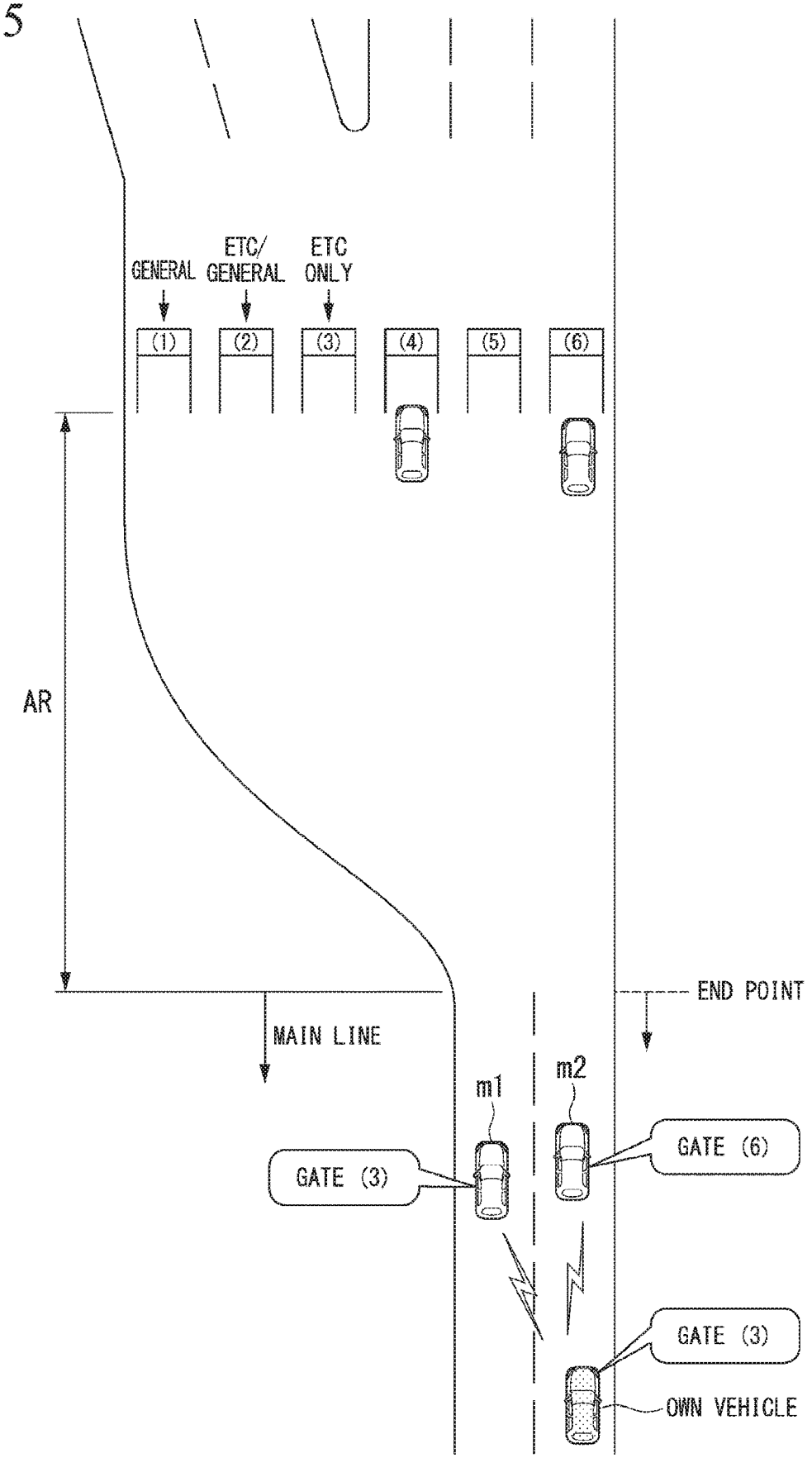
FIG. 5 is a diagram showing an example of a scenario in which a following target vehicle is selected in a main line.
Figure 6:
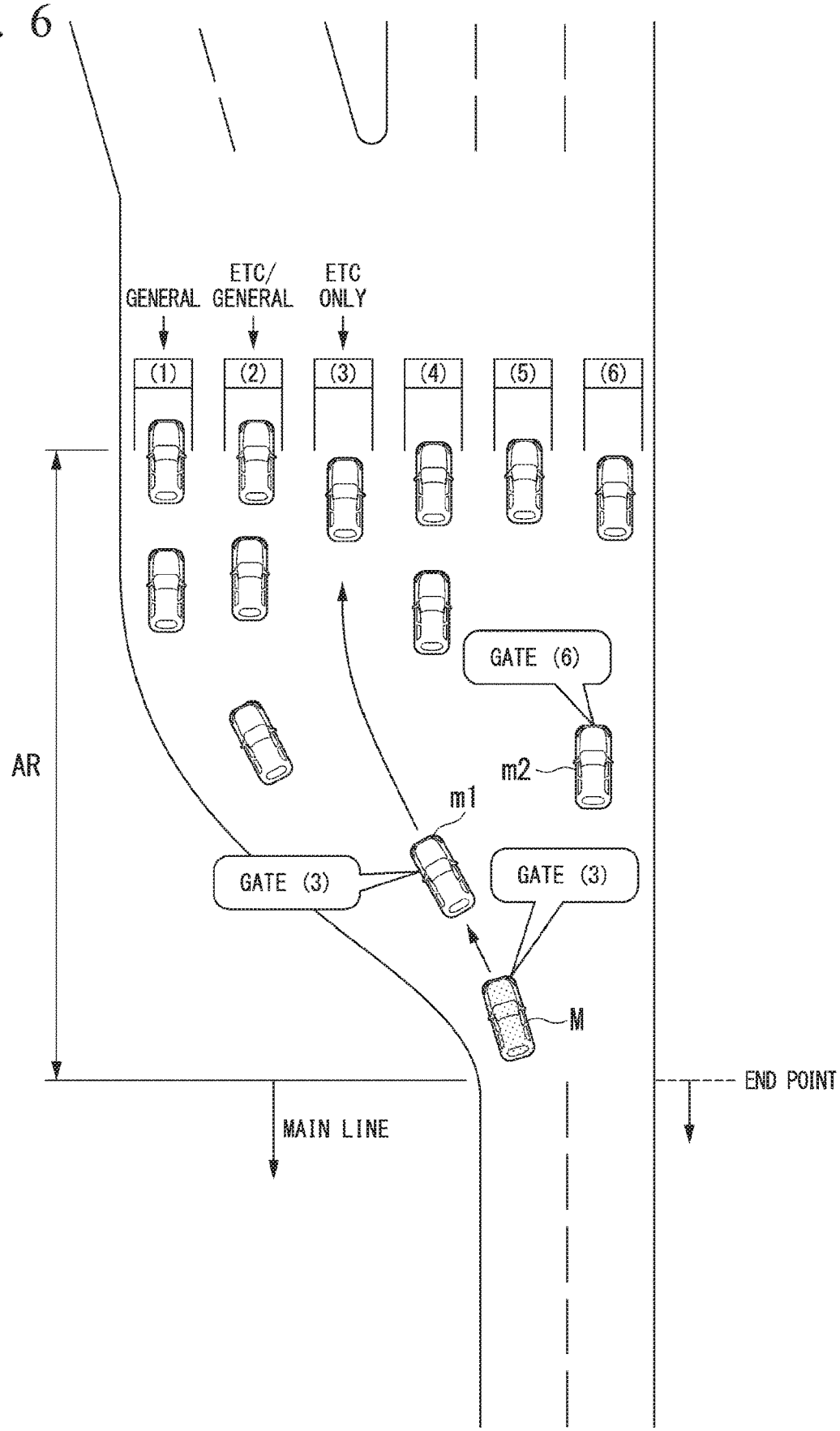
FIG. 6 is a diagram showing an example of a scenario in which the own vehicle M which has changed lanes enters a non-lane-line area AR and follows another vehicle M.

FIG. 5 is a diagram showing an example of a scenario in which a following target vehicle is selected in a main line. The information acquirer 110 acquires, from other vehicles m1 and m2 present near the own vehicle M, information on gates through which they are scheduled to pass. For example, when the gate through which the other vehicle m1 is scheduled to pass is gate (3) and the gate through which the other vehicle m2 is scheduled to pass is the gate (6), the vehicle selector 123B selects the other vehicle m1, which is scheduled to pass through the same gate as the gate (3) through which the own vehicle M is scheduled to pass, as a following target vehicle. Then, the gate passage controller 123C causes the own vehicle M to change lanes to the lane in which the other vehicle m1 is traveling and performs control for passing through the gate (3), following the other vehicle m1 as shown in FIG. 6. FIG. 6 shows an example of a scenario in which the own vehicle M which has changed lanes in an area in which there are road lane lines enters a non-lane-line area AR in which no road lane lines are drawn (which is an area between gates and the main line before the gates) and follows another vehicle m.

As described above, the behavior plan generator 123 selects a following target vehicle in the area in which there are road lane lines and performs control for following the selected following target vehicle, whereby it is easier to follow the following target vehicle and thus it is possible to smoothly control the vehicle. This is because, in the main line, lanes are drawn and the other vehicle m is traveling on the basis of the lanes and thus it is relatively easy to predict the behavior of the other vehicle m.

Figure 7:
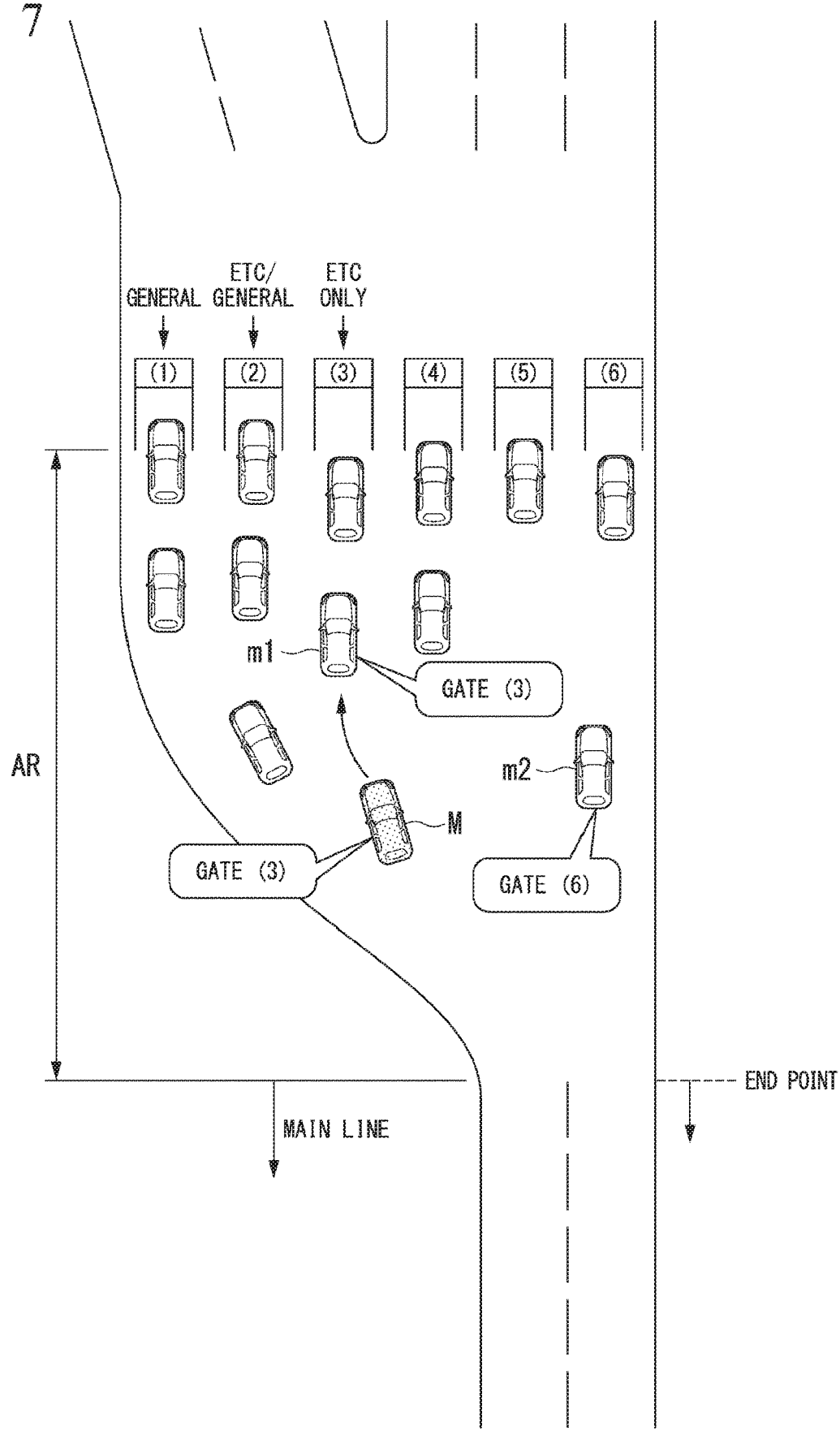
FIG. 7 is a diagram showing an example of a scenario in which a following target vehicle is selected in the non-lane-line area AR.

FIG. 7 is a diagram showing an example of a scenario in which a following target vehicle is selected in the non-lane-line area AR. For example, when the gate through which another vehicle m1 is scheduled to pass is gate (3), the vehicle selector 123B selects the other vehicle m1, which is scheduled to pass through the same gate as the gate (3) through which the own vehicle M is scheduled to pass and is located at the tail end of a vehicle line formed toward the gate, as a following target vehicle. Then, the gate passage controller 123C performs control for passing through the gate (3), following the other vehicle m located at the tail end of the vehicle line formed toward the gate (3). In the non-lane-line area AR, another vehicle included in a vehicle line may be selected as a following target vehicle and then be followed.

As described above, the behavior plan generator 123 selects a following target vehicle in the area in which there are no road lane lines and performs control for following the selected following target vehicle, whereby the own vehicle M more reliably follows another vehicle which is scheduled to pass through it and thus it is possible to smoothly control the vehicle. This is because, in the non-lane-line area AR, another vehicle m may change the gate through which it is scheduled to pass, but another vehicle located at the tail end of a vehicle line is less likely to change the gate through which it is scheduled to pass. However, since no lanes are drawn in the non-lane-line area AR, it may be difficult to predict the behaviors of other vehicles m before they reach a vehicle line. Therefore, the vehicle selector 123B may select another vehicle m, whose behavior is stable and which is easy to follow, as a following target vehicle.

Figure 8:
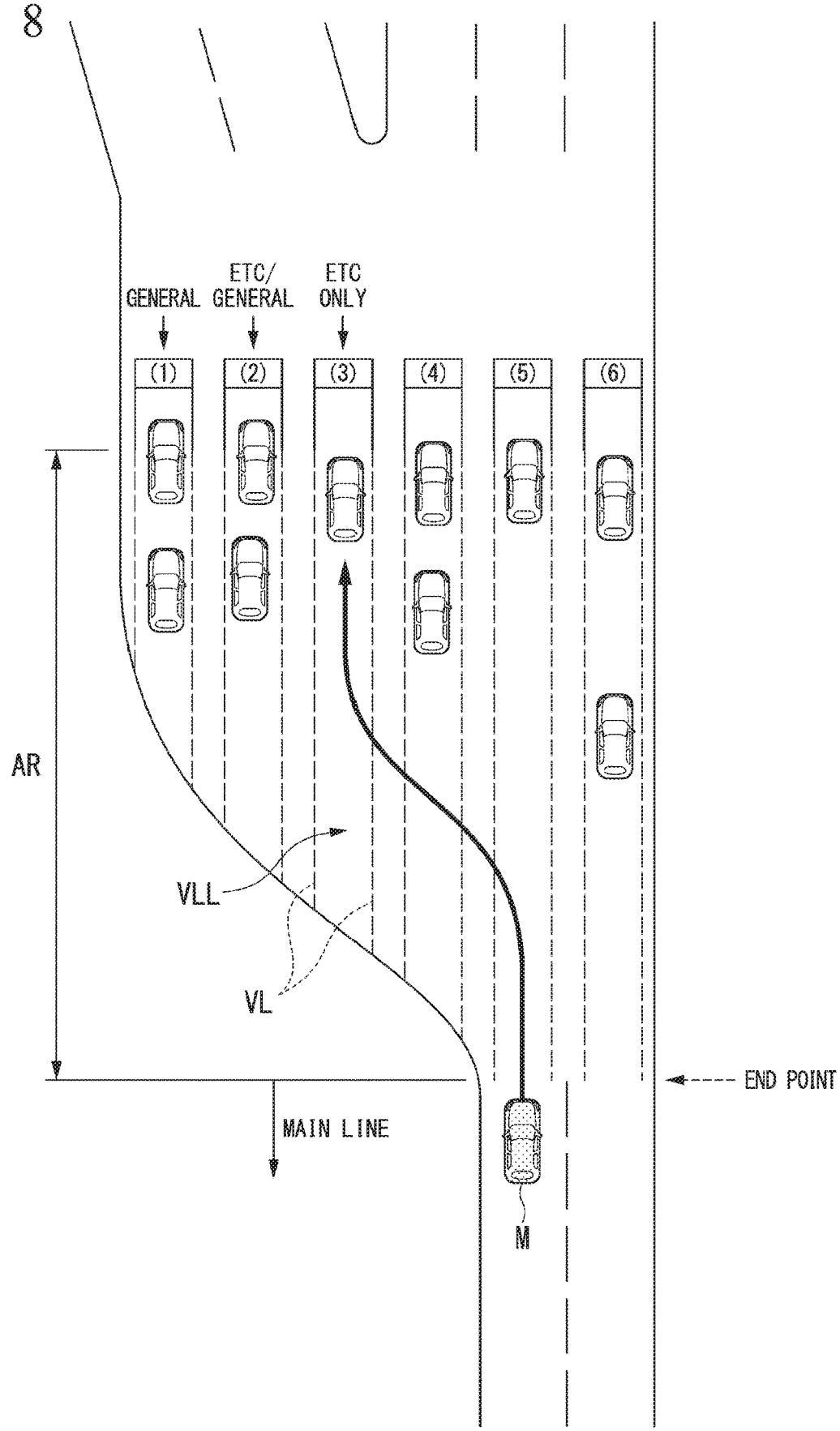
FIG. 8 is a diagram showing an example of a scenario in which the own vehicle M travels in a virtual lane VLL formed by virtual lines VL.

When there are no other vehicles which are scheduled to pass through the same gate, the gate passage controller 123C performs control for passing through the gate selected in step S100 without following another vehicle (step S110). For example, the gate passage controller 123C sets virtual lines which virtually extend backward from both ends of pillars of gates and performs control for traveling in a lane formed by the virtual lines or changing the lanes and passing through the selected gate. FIG. 8 is a diagram showing an example of a scenario in which the own vehicle M travels in a virtual lane VLL formed by virtual lines VL.

[Modification of Flowchart]

Figure 9:
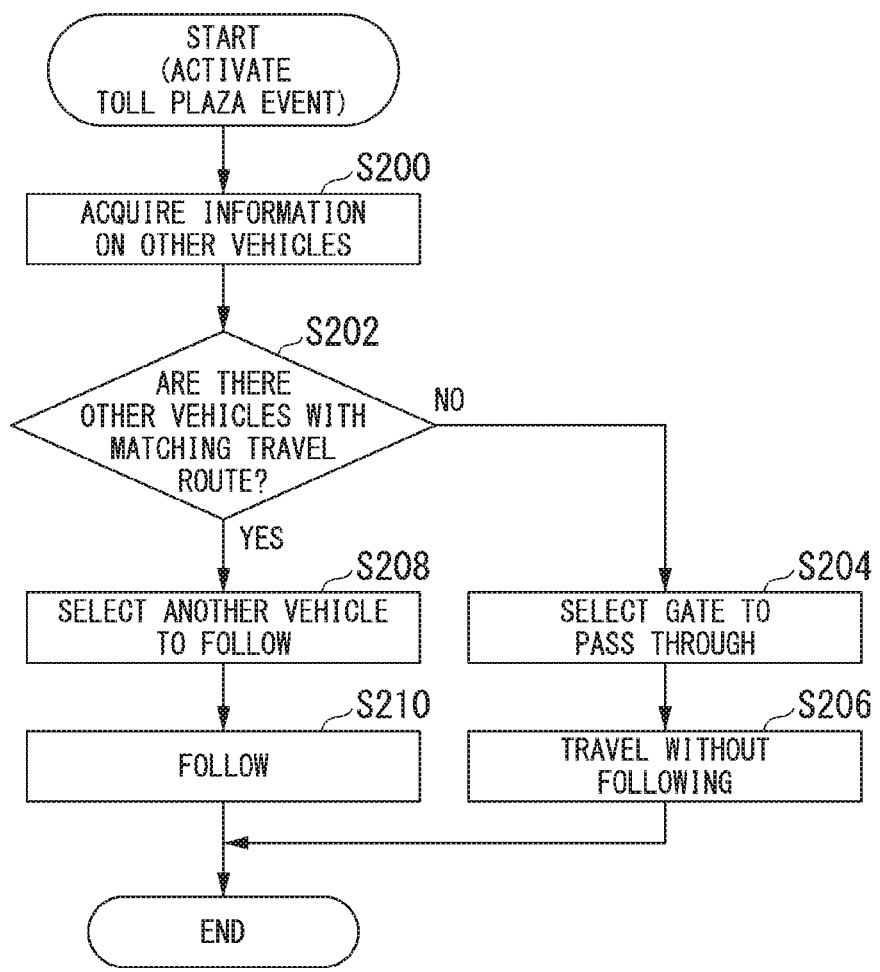
FIG. 9 is a flowchart showing a flow of a process executed by a behavior plan generator 123.

The behavior plan generator 123 may execute the following process instead of the process of the flowchart of FIG. 4. FIG. 9 is a flowchart showing a flow of a process executed by the behavior plan generator 123.

First, the information acquirer 110 acquires information on other vehicles present near the own vehicle M (step S200). Next, on the basis of the information on other vehicles acquired in step S102, the vehicle selector 123B determines whether or not there are other vehicles scheduled to travel along a route that matches the route along which the own vehicle M is scheduled to travel (step S202). The information on other vehicles in this process is, for example, information such as lanes in which the other vehicles are scheduled to travel after passing through gates, routes along which the other vehicles are scheduled to travel, and the destinations of the other vehicles. The other vehicles scheduled to travel along a route that matches the route along which the own vehicle M is scheduled to travel include, for example, those scheduled to travel in the same lane as the lane in which the own vehicle M is scheduled to travel after passing through the gates or those for which the same destination as that set for the own vehicle M has been set.

When there are no other vehicles scheduled to travel along a route that matches the travel route of the own vehicle M, the gate selector 123A selects a gate to pass through from among the gates provided at the toll plaza (step S204). Next, the gate passage controller 123C performs control for passing through the gate selected in step S204 (step S206).

When there are other vehicles scheduled to travel along a route that matches the travel route of the own vehicle M, the vehicle selector 123B selects a following target vehicle which the own vehicle M is to follow from among the other vehicles whose travel route matches that of the own vehicle M on the basis of the information on other vehicles acquired in step S200 (step S208). At this time, the following target vehicle may be selected on the basis of the type of the gate.

For example, the vehicle selector 123B selects another vehicle that can pass through the gate using a vehicle-mounted ETC device as a following target vehicle when the own vehicle M can pass through the gate using the vehicle-mounted ETC device 40 and selects another vehicle that cannot pass through the gate using a vehicle-mounted ETC device 40 as a following target vehicle when the own vehicle M cannot pass through the gate using the vehicle-mounted ETC device 40. In this case, the vehicle information on other vehicles includes information indicating whether or not they can pass through gates using vehicle-mounted ETC devices 40.

Next, the gate passage controller 123C performs control for following the following target vehicle selected in step S208 to pass through the selected gate (step S210). Then, the process of this flowchart ends. Through the process described above, the gate passage controller 123C can smoothly control the vehicle when passing through a gate.

[Control at the Time of Following]

Figure 10:
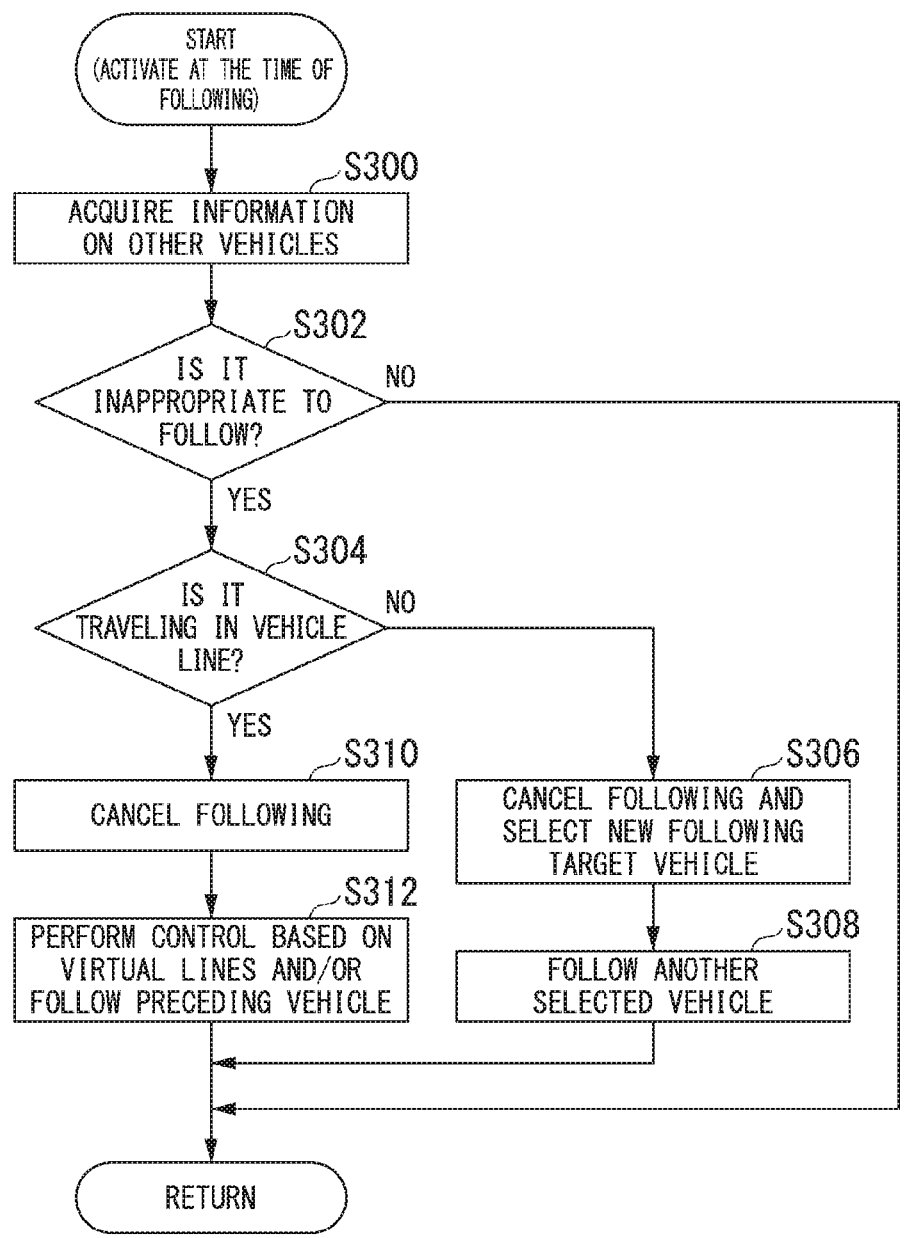
FIG. 10 is a flowchart showing a flow of a process executed by the behavior plan generator 123 at the time of following.

FIG. 10 is a flowchart showing a flow of a process executed by the behavior plan generator 123 at the time of following. The process of this flowchart is executed when the gate passage controller 123C performs control for following the following target vehicle.

First, the information acquirer 110 acquires information on other vehicles present near the own vehicle M (step S300). Next, the gate passage controller 123C determines whether or not it is inappropriate to follow the following target vehicle on the basis of the state of the following target vehicle (step S302). That it is inappropriate to follow the following target vehicle includes that the gate through which the following target vehicle is scheduled to pass has changed, that the destination or the like of the following target vehicle has changed, that the traveling state of the following target vehicle is inappropriate for the own vehicle M, or the like. That the traveling state of the following target vehicle is inappropriate for the own vehicle M includes, for example, that a change in behavior of the following target vehicle is equal to or greater than a predetermined degree or that the following target vehicle has stopped.

When it is not inappropriate to follow the following target vehicle, the process of one routine of this flowchart ends. When it is inappropriate to follow the following target vehicle, the gate passage controller 123C determines whether or not the own vehicle M is traveling in a vehicle line (step S304). That the vehicle is traveling in a vehicle line includes that the own vehicle M is traveling in the same direction or stationary heading in the same direction as that of other vehicles lined up toward a gate while maintaining a predetermined distance from the other vehicles.

When the own vehicle M is not traveling in a vehicle line, the gate passage controller 123C cancels the following and causes the vehicle selector 123B to execute the process of selecting a following target vehicle (the process of step S106 in FIG. 4 or the process of step S208 in FIG. 9) (step S306). Next, the gate passage controller 123C performs control for following the following target vehicle selected in step S306 (step S308).

Figure 11:
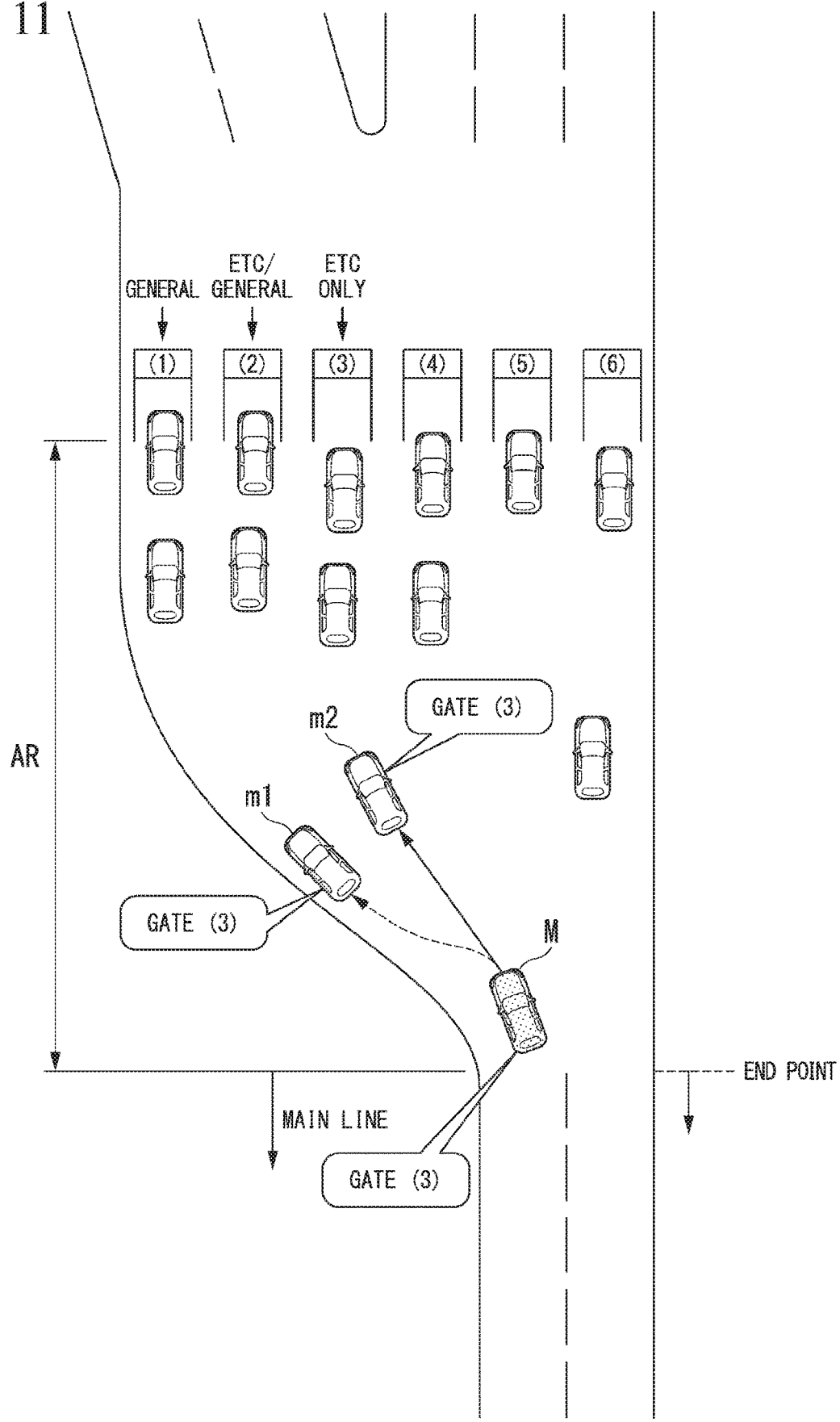
FIG. 11 is diagram (1) for explaining a process when the following is inappropriate and the own vehicle is not traveling in a vehicle line.

FIG. 11 is diagram (1) for explaining a process when the following is inappropriate and the own vehicle M is not traveling in a vehicle line. Here, for example, it is assumed that, although the own vehicle M is following another vehicle m1, the gate passage controller 123C determines that it is inappropriate to follow the other vehicle m1 since the other vehicle m1 has stopped. In this case, the gate passage controller 123C selects another vehicle m2 as a following target vehicle and performs control for following the other vehicle m2. The other vehicle m2 is a vehicle scheduled to pass through the same gate as that through which the own vehicle M is scheduled to pass. Thus, even when the following has become inappropriate, the gate passage controller 123C performs control for following a new following target vehicle, and therefore it is possible to smoothly control the vehicle when passing through a gate.

Figure 12:
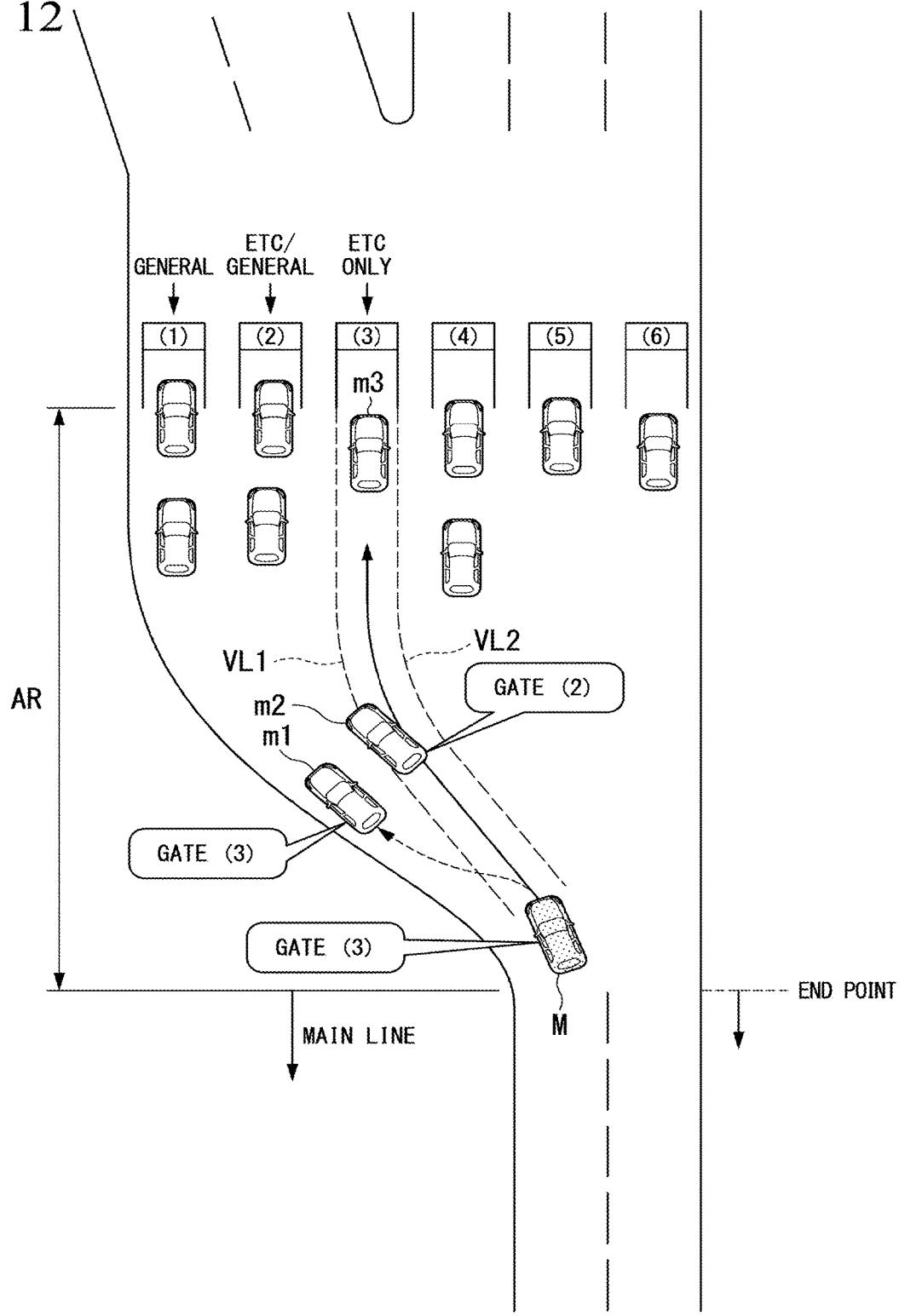
FIG. 12 is a diagram showing how virtual lines are set when the following is inappropriate and the own vehicle is not traveling in a vehicle line.

A process below may be executed instead of the process of steps S306 and S308 described above. When the own vehicle M is not traveling in a vehicle line, the gate passage controller 123C cancels the following. Next, the vehicle selector 123B determines whether or not there is a following target vehicle. Then, when there is a following target vehicle, the vehicle selector 123B selects the following target vehicle. In this case, the gate passage controller 123C performs control for following the following target vehicle selected by the vehicle selector 123B. When there is no following target vehicle, the gate passage controller 123C sets virtual lines for a gate through which the own vehicle M is scheduled to pass and controls the own vehicle M on the basis of the set virtual lines. FIG. 12 is a diagram showing how virtual lines are set when the following is inappropriate and the vehicle is not traveling in a vehicle line. For example, similar to FIG. 11, it is assumed that the gate passage controller 123C determines that it is inappropriate to follow another vehicle m1 since the other vehicle m3 has stopped. In this case, it is also assumed that there is only another vehicle m2 heading to gate (2) near the own vehicle M and there are no other vehicles m2 heading to gate (3). At this time, the vehicle selector 123B determines that there is no following target vehicle. Then, the gate passage controller 123C sets virtual lines VL1 and VL2 heading to the gate (3) and performs control for traveling to the gate (3) on the basis of a virtual lane formed by the set virtual lines VL1 and VL2. Thus, even when the following has become inappropriate and there is no following target vehicle, the gate passage controller 123C performs control of the own vehicle M on the basis of virtual lines, and therefore it is possible to smoothly control the vehicle when passing through a gate.

Returning to the description of FIG. 10, when the own vehicle M is traveling in a vehicle line, the gate passage controller 123C cancels the following of the following target vehicle (step S310), and sets a virtual lane extending from the pillars at both ends of the gate and performs control for traveling on the basis of the set virtual lane or control for following a preceding vehicle (step S312). Then, the gate passage controller 123C performs control for passing through the gate. Then, the process of one routine of this flowchart ends.

Figure 13:
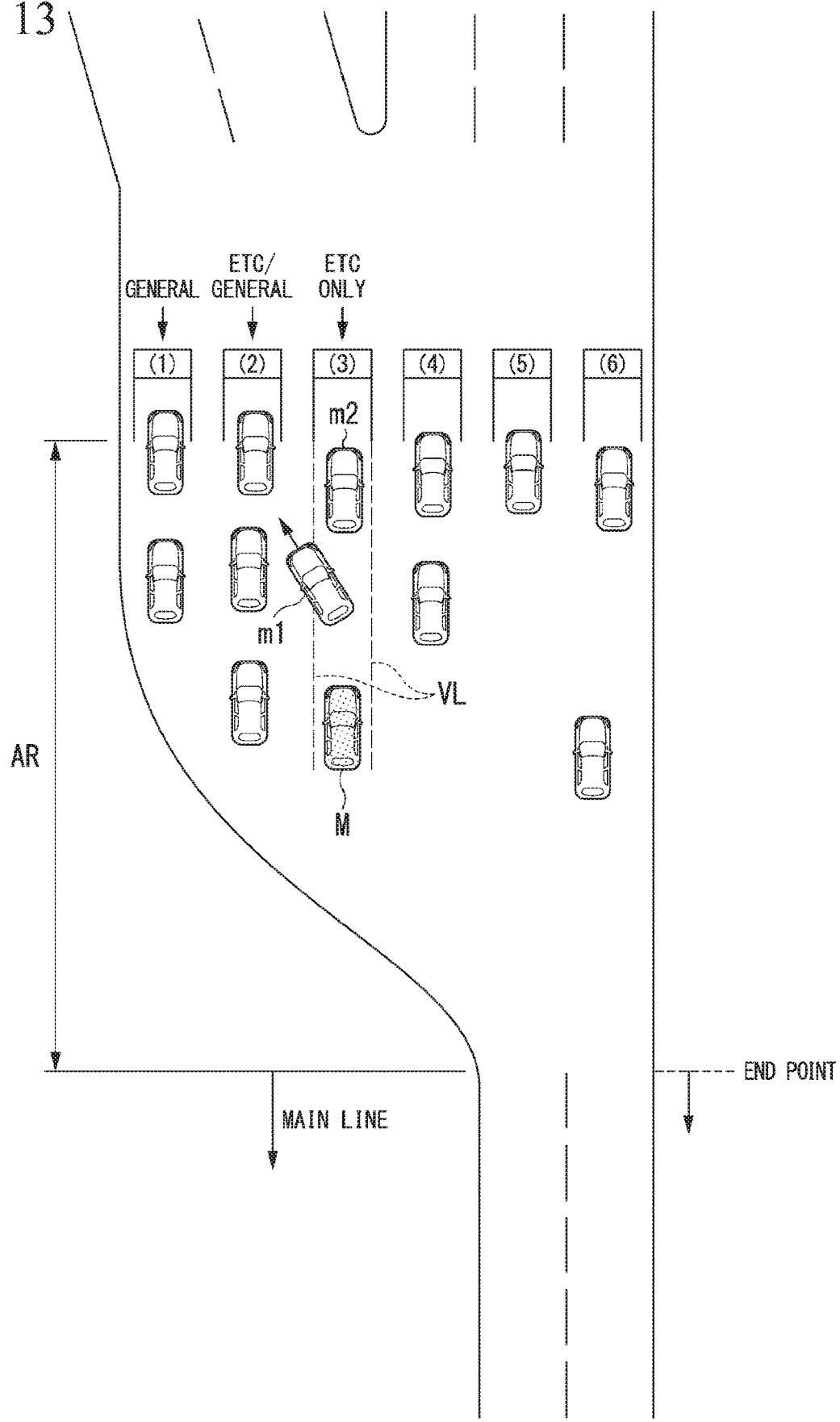
FIG. 13 is a diagram for explaining a process when the following is inappropriate and the own vehicle is traveling in a vehicle line.

FIG. 13 is a diagram for explaining a process when the following is inappropriate and the vehicle is traveling in a vehicle line. Here, for example, it is assumed that, although the own vehicle M is following another vehicle m1, the other vehicle m1 has changed lanes to cut into an adjacent vehicle line. In this case, the gate passage controller 123C determines that it is inappropriate to follow the other vehicle m1 because there is no area in which the own vehicle M can cut into the vehicle line that the other vehicle m1 has cut into. Then, the gate passage controller 123C cancels the following of the other vehicle m1. At this time, for example, the gate passage controller 123C performs travel in the same direction as that at the time of following travel (toward gate (3)) or sets virtual lines extending from the pillars at both ends of the gate and performs control for traveling on the basis of a virtual lane formed by the set virtual lines. Further, the gate passage controller 123C may, for example, perform following travel using another vehicle m2, which has become a preceding vehicle after the following target vehicle has changed lanes, as a following target vehicle. Thus, even when the following has become inappropriate, the gate passage controller 123C can smoothly control the vehicle when passing through the gate.

In the above example, it has been described that the vehicle selector 123B selects a following target vehicle on the basis of the information on other vehicles acquired by the information acquirer 110. However, the vehicle selector 123B may instead select a designated vehicle, which has been designated in advance, as a following target vehicle. The designated vehicle is a vehicle heading in the same direction as the own vehicle M and is, for example, another vehicle designated by an occupant of the vehicle. For example, the occupant of the vehicle operates the HMI 30 to cause the camera 10 to capture another vehicle as a designated vehicle, causes the object recognition device 16 to analyze the captured image, and causes the object recognition device 16 to recognize the designated vehicle. The object recognition device 16 can determine whether or not an object is a designated vehicle by analyzing an image captured by the camera 10 in this manner. For example, in front of the gate, the vehicle selector 123B selects the designated vehicle as a following target vehicle on the basis of the recognition result of the object recognition device 16. Thus, the gate passage controller 123C can smoothly control the vehicle when passing through the gate.

Further, the vehicle selector 123B may select a following target vehicle on the basis of a recognition result of the external environment recognizer 121. The recognition result of the external environment recognizer 121 is an example of "information that enables determination of a gate through which another vehicle is scheduled to pass." For example, when another vehicle is heading to a predetermined gate (for example, a gate whose adjacent gate is closed), the vehicle selector 123B determines that the other vehicle is heading to the predetermined gate and selects the other vehicle heading to the predetermined gate as a following target vehicle if the predetermined gate and the gate selected by the own vehicle M are the same.

According to the first embodiment described above, the gate passage controller 123C causes the own vehicle to travel following a following target vehicle selected by the vehicle selector 123B which selects the following target vehicle which it is to follow when traveling in front of a gate, and thus it is possible to smoothly control the vehicle.

Second Embodiment

A second embodiment will be described below. In the first embodiment, it is assumed that information on other vehicles is acquired by inter-vehicle communication. On the contrary, in the second embodiment, information on other vehicles is acquired from a traffic information providing server. Hereinafter, differences from the first embodiment will be mainly described.

Figure 14:
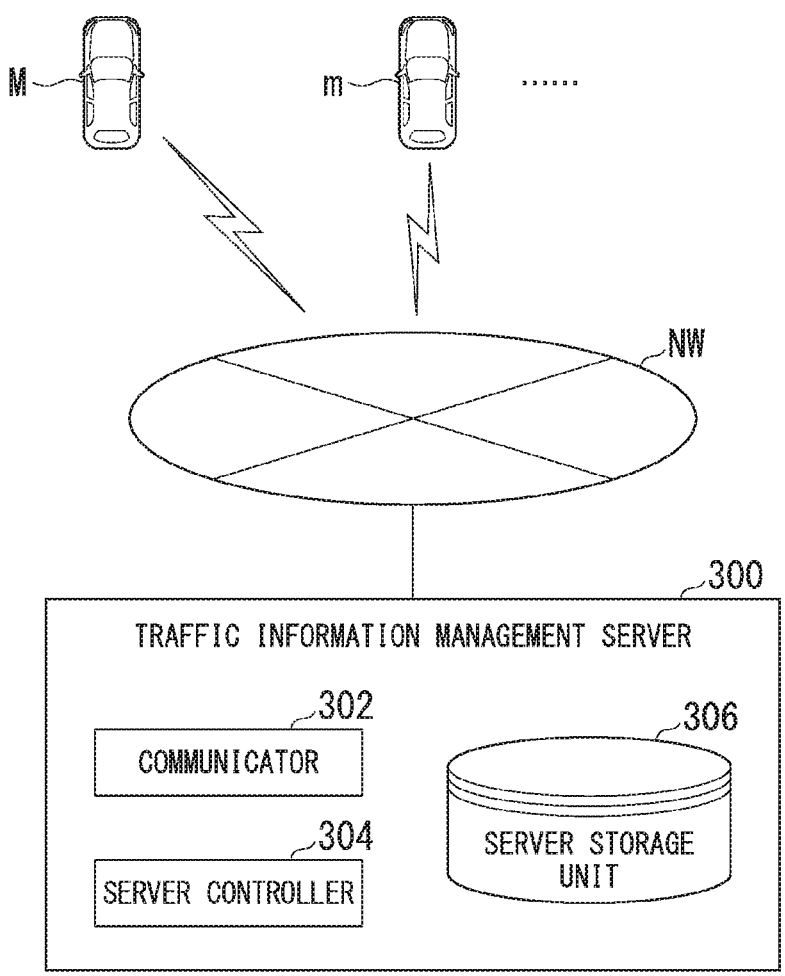
FIG. 14 is a diagram showing an example of a traffic information providing system including the own vehicle M in which the vehicle system is mounted.

FIG. 14 is a diagram showing an example of a traffic information providing system including the own vehicle M in which the vehicle system 1 is mounted. The traffic information providing system includes the own vehicle M, one or more other vehicles m, and a traffic information management server 300. For example, a communication device that communicates with at least the traffic information management server 300 and a device having a function of specifying the position of the vehicle are mounted in each of the other vehicles m. Each of the other vehicles m in which such devices are mounted transmits position information of the vehicle to the traffic information management server 300.

For example, communication using a network NW is performed between the traffic information management server 300 and vehicles including one or both of the own vehicle M and other vehicles m. The network NW includes, for example, a cellular network, a Wi-Fi network, a wide area network (WAN), a local area network (LAN), the Internet, a dedicated line, a wireless base station, or a provider.

The traffic information management server 300 manages information transmitted by vehicles and traffic information which is based on detection results of vehicle detection sensors (for example, cameras) installed on a road or the like. The traffic information management server 300 also distributes the managed traffic information to vehicles at predetermined intervals using the above-mentioned network NW or transmits, in response to a request from a vehicle, traffic information to the requester.

The traffic information management server 300 includes, for example, a communicator 302, a server controller 304, and a server storage unit 306. The server controller 304 is realized by a processor executing a program. The server controller 304 may be realized by hardware such as an LSI or an ASIC or may be realized by a combination of software and hardware. The server storage unit 306 is realized by a ROM, a RAM, an HDD, a flash memory, or the like.

The communicator 302 communicates with vehicles to acquire information. The communicator 302 acquires vehicle IDs of vehicles (identification information of vehicles), information on gates through which the vehicles are scheduled to pass, the destinations of the vehicles, and position information indicating the positions of the vehicles, together with the transmission time at which the information was transmitted. Hereinafter, these pieces of information are referred to as "vehicle information."

The server controller 304 transmits information regarding vehicle information to the own vehicle M in response to a request from the own vehicle M. In this case, the server controller 304 derives vehicle information on other vehicles traveling on a link designated by the request by referring to vehicle information using the designated link as a search key and provides the derived vehicle information to the own vehicle M.

The vehicle selector 123B selects a following target vehicle on the basis of the vehicle information on other vehicles transmitted by the traffic information management server 300.

Figure 15:
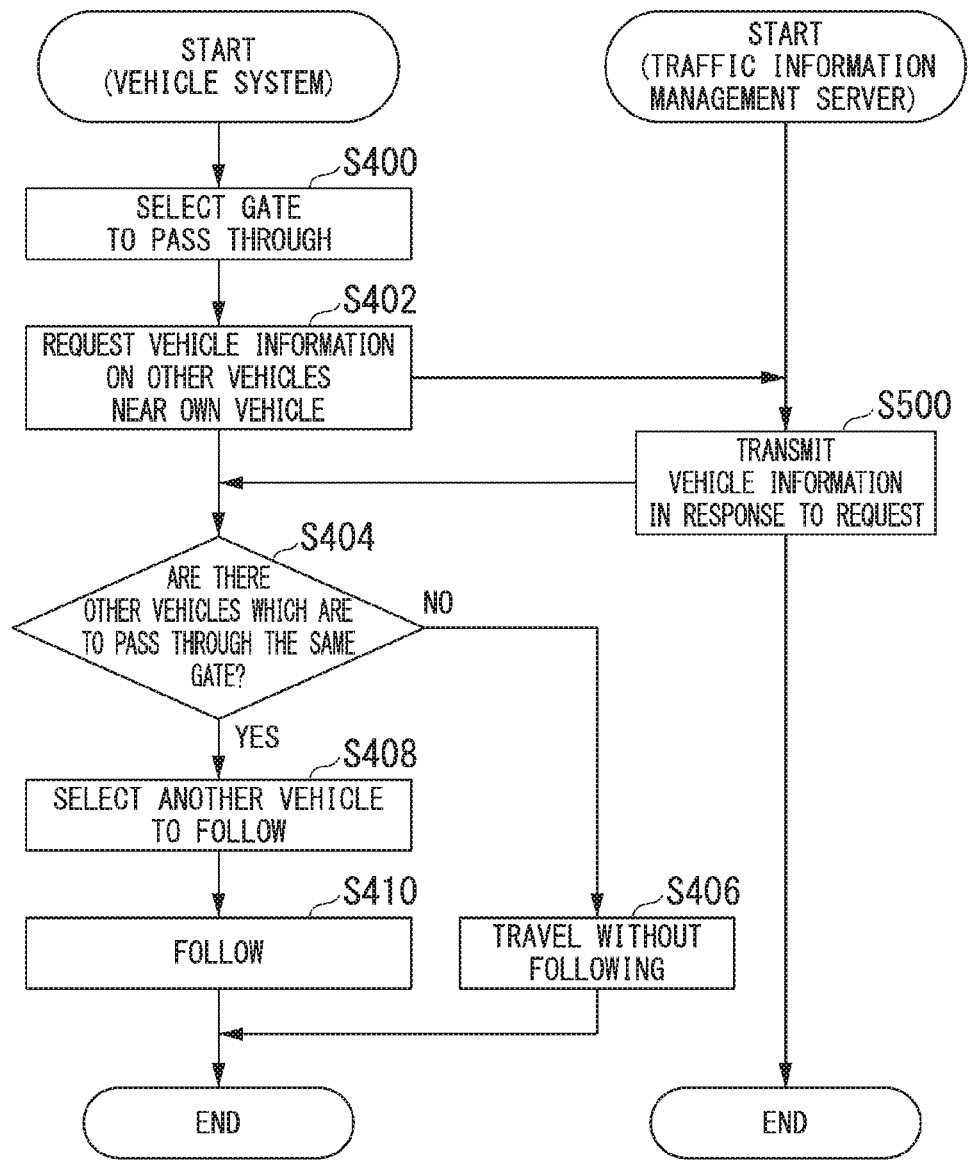
FIG. 15 is a flowchart showing a flow executed by the vehicle system and the traffic information management server.

FIG. 15 is a flowchart showing a flow executed by the vehicle system 1 and the traffic information management server 300. When a toll plaza event is activated, the gate selector 123A of the vehicle system 1 selects a gate to pass through from among gates provided at the toll plaza (step S400). Next, the vehicle selector 123B transmits position information of the own vehicle M and requests that the traffic information management server 300 transmit vehicle information on other vehicles near the own vehicle M (step S402). Next, the server controller 304 of the traffic information management server 300 transmits the vehicle information on other vehicles stored in the server storage unit 306 to the vehicle system 1 in response to the request transmitted by the gate selector 123A (step S500).

Next, the vehicle selector 123B determines whether or not there are other vehicles scheduled to pass through the same gate as that selected in step S400 on the basis of the vehicle information on other vehicles present near the own vehicle M which the information acquirer 110 has acquired in step S402 (step S404).

When there are no other vehicles scheduled to pass through the same gate, the gate passage controller 123C performs control for passing through the gate selected in step S400 without following another vehicle (step S406).

When there are other vehicles scheduled to pass through the same gate, the vehicle selector 123B selects a following target vehicle which the own vehicle M is to follow from among the other vehicles scheduled to pass through the same gate as that of the own vehicle M on the basis of the information on other vehicles acquired in step S402 (step S408). Then, the gate passage controller 123C performs control for following the following target vehicle selected in step S408 to pass through the selected gate (step S410). Then, the process of this flowchart ends. Through the process described above, the gate passage controller 123C can smoothly control the vehicle when passing through the gate.

In the example described above, it has been described that the traffic information management server 300 transmits vehicle information on other vehicles to the vehicle system 1. However, alternatively, the server controller 304 of the traffic information management server 300 may derive a following target vehicle and transmit vehicle information on the derived following target vehicle to the vehicle system 1. The vehicle selector 123B acquires vehicle information on the following target vehicle from the traffic information management server 300 and selects a following target vehicle on the basis of the acquired vehicle information. In this case, the vehicle selector 123B further transmits information on the gate selected by the gate selector 123A to the traffic information management server 300 in the process of step S402.

According to the second embodiment described above, the behavior plan generator 123 selects a following target vehicle on the basis of vehicle information on other vehicles acquired from the traffic information management server 300 and therefore it is possible to achieve advantages similar to those of the first embodiment.

Although the modes for carrying out the present invention have been described above by way of embodiments, the present invention is not limited to these embodiments at all and various modifications and substitutions can be made without departing from the gist of the present invention.

What is claim is:

1. A vehicle control system comprising a processor, the processor being configured to:
    select a gate through which an own vehicle is to pass among gates provided at a toll plaza;
    acquire information that enables determination of a gate through which each of other vehicles present in a peripheral area of the own vehicle is to pass, the peripheral area including a front area and a side area of the own vehicle;
    determine the gate through which each of the other vehicles is to pass based on the information;
    select, from among vehicles that are determined to pass through the same gate as the gate through which the own vehicle is to pass, another vehicle that the own vehicle is to follow when traveling in front of a gate as a following target vehicle; and
    cause the own vehicle to travel following the following target vehicle when passing through the gate.

2. The vehicle control system according to claim 1, wherein the processor is configured to:

select the gate through which the own vehicle is to pass through among gates provided at the toll plaza based on determining that it is relatively easy to enter the lane scheduled to be traveled in, and select the another vehicle, which is determined to pass through the gate, as the following target vehicle.

3. The vehicle control system according to claim 1, wherein the processor selects, as the following target vehicle, another vehicle located at a tail end of a vehicle line.

4. The vehicle control system according to claim 1, the processor is configured to acquire a route along which each of the other vehicles is scheduled to travel after passing through the gate, and select, as the following target vehicle, the another vehicle scheduled to travel along the route that matches a route along which the own vehicle is scheduled to travel based on the acquired route along which each of the other vehicles is scheduled to travel.

5. The vehicle control system according to claim 1, wherein the processor is configured to, when there are a plurality of candidate vehicles that are likely to be a following target vehicle, select a candidate vehicle present at a position closest to the own vehicle among the plurality of candidate vehicles as the following target vehicle.

6. The vehicle control system according to claim 1, wherein the processor is configured to start following the following target vehicle within an area in which road lane lines are drawn.

7. The vehicle control system according to claim 6, wherein the processor is configured to cause the own vehicle to change lanes to an adjacent lane when the processor has determined that the following target vehicle is not present in front of the own vehicle and is present in the adjacent lane.

8. The vehicle control system according to claim 1, wherein the processor is configured to cancel control for following a following target vehicle upon determining that it is inappropriate to follow the following target vehicle based on a state of the following target vehicle.

9. The vehicle control system according to claim 8, wherein the processor is configured to, when the processor has determined that it is inappropriate to follow the following target vehicle, select a vehicle, from among the vehicles that are determined to pass through the same gate as the gate through which the own vehicle is to pass, different from the selected following target vehicle as a new following target vehicle.

10. The vehicle control system according to claim 1, wherein the processor is configured to acquire information on a type of a gate through which the other vehicles are able to pass through and to select the following target vehicle based on of the information on the type of the gate.

11. The vehicle control system according to claim 1, wherein the processor is configured to, when the processor has selected the another vehicle present in the side area of the own vehicle as the following target vehicle, cause the own vehicle to temporarily move back or temporarily stop so as to be located behind the following target vehicle.

12. The vehicle control system according to claim 1, wherein the processor is configured to acquire a destination at which each of the other vehicles are scheduled to arrive after passing through the gate, derive a route along which each of the other vehicles is scheduled to travel, and select, as the following target vehicle, the another vehicle scheduled to travel along the route that matches a route along which the own vehicle is scheduled to travel based on the derived route along which each of the other vehicles is scheduled to travel.

13. A vehicle control method comprising:

selecting, by an in vehicle computer, a gate through which an own vehicle is to pass among gates provided at a toll plaza;

acquiring, by the in vehicle computer, information that enables determination of a gate through which each of other vehicles present in a peripheral area of the own vehicle is to pass, the peripheral area including a front area and a side area of the own vehicle;

determining, by the in vehicle computer, the gate through which each of the other vehicles is to pass based on the information;

selecting, by the in vehicle computer, from among vehicles that are determined to pass through the same gate as the selected gate, another vehicle that the own vehicle is to follow when traveling in front of a gate as a following target vehicle; and causing, by the in vehicle computer, the own vehicle to travel following the following target vehicle when passing through the gate.

14. A computer-readable non-transitory storage medium storing a vehicle control program causing an in-vehicle computer to perform control for:

selecting a gate through which an own vehicle is to pass among gates provided at a toll plaza;

acquiring information that enables determination of a gate through which each of other vehicles present in a peripheral area of the own vehicle is to pass, the peripheral area including a front area and a side area of the own vehicle;

determining the gate through which each of the other vehicles is to pass based on the information;

selecting, from among vehicles that are determined to pass through the same gate as the selected gate, another vehicle that the own vehicle is to follow when traveling in front of a gate as a following target vehicle; and causing the own vehicle to travel following the following target vehicle when passing through the gate.

* * * * *